June 18, 1963  J. LINDSTROM ETAL  3,094,291
PORTABLE WASTE DISPOSAL APPARATUS
Filed Nov. 7, 1960  3 Sheets-Sheet 1

INVENTORS
JOUBERT LINDSTROM
& FRED W. MOORE
BY

THEIR ATTORNEY

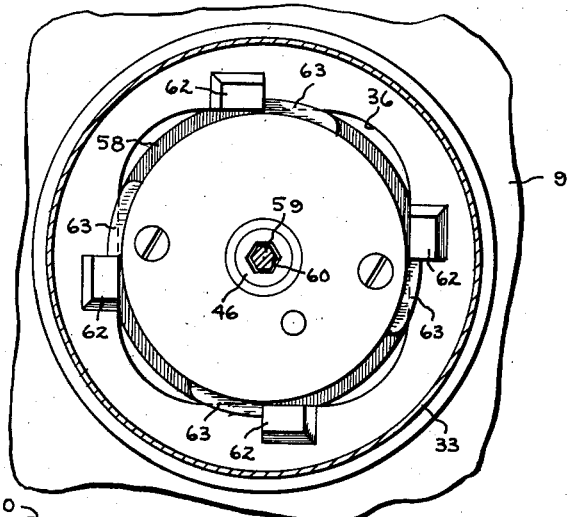
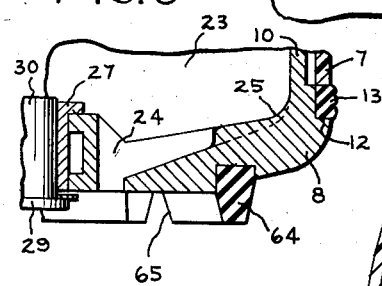
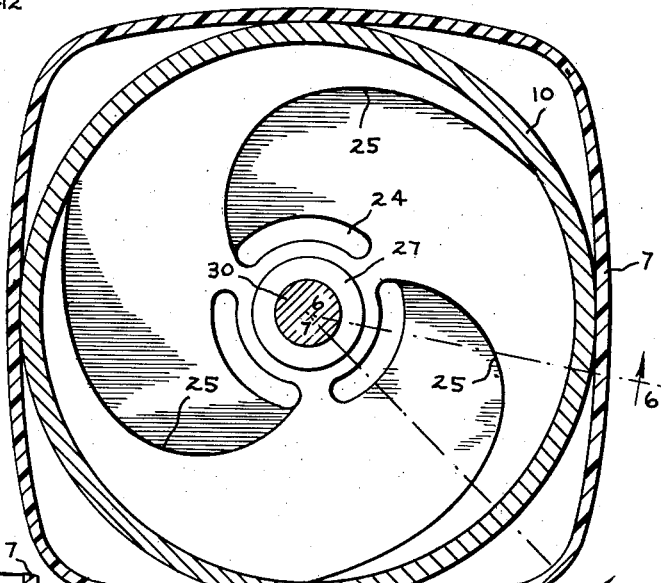
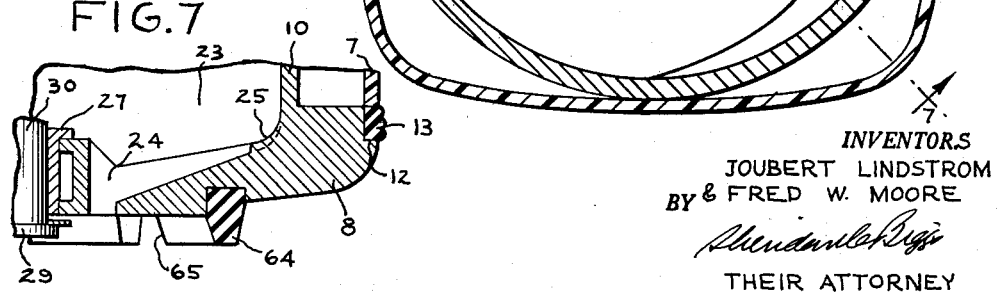
INVENTORS
JOUBERT LINDSTROM
BY & FRED W. MOORE
THEIR ATTORNEY

United States Patent Office 3,094,291
Patented June 18, 1963

3,094,291
PORTABLE WASTE DISPOSAL APPARATUS
Joubert Lindstrom and Fred W. Moore, Louisville, Ky., assignors to General Electric Company, a corporation of New York
Filed Nov. 7, 1960, Ser. No. 67,630
14 Claims. (Cl. 241—258)

This invention relates to apparatus for the disposal of waste material wherein garbage and other kitchen wastes are comminuted in the presence of water by power driven comminuting means to a flowable mixture and the resultant mixture flushed to the waste disposal system of the house; and it is especially concerned with the provision of portable apparatus of this kind which may be mounted in the kitchen sink in position to discharge the comminuted waste into the sink drain opening and in which position the kitchen faucet may be used to supply water to the apparatus for the comminuting operation.

This invention especially contemplates the provision of portable waste food disposal apparatus which is light in weight and generally convenient to use, and which is inherently safe to operate.

In general this invention contemplates the division of the apparatus into two parts—one a hopper which will include the comminuting means which is fastened or secured therein, and the second part—a readily removable power unit separable from the first and including the power means for driving the comminuting means. The arrangement provides for the complete removal of the power unit for storage when the apparatus is not being used, and the use in the sink of the remaining apparatus which includes the hopper and comminuting means and is usable as a storage receptacle for the waste material as it accumulates. It further contemplates such improved apparatus wherein the power unit automatically is brought into quick-connect driving relation with the comminuting means in the hopper by the mere act of placing the power unit into its operating position with respect to the hopper.

A further object of this invention is the provision of such portable disposal apparatus wherein the storage receptacle, which as indicated normally may be left in the sink for storage of the waste, may be provided with a wide, easy access opening for the waste material, and which opening is substantially closed by the power unit when moved into its operating position for driving the comminuting means, thereby to insure that the apparatus is inherently safe for operation in that it is impossible to insert the hand or fingers into the waste receiving hopper where the comminuting takes place when the apparatus is conditioned for operation.

Briefly stated, in accordance with this invention, a hopper and comminuting unit is provided which includes a hopper which is provided with an ingress opening through which the waste material and water are inserted into the hopper. This unit normally may be left in the sink for the reception and storage of waste material as it accumulates. Located in the hopper are comminuting means for comminuting the waste material and for discharging it through a discharge opening provided in the hopper and located conveniently to discharge the comminuted waste down through the normal sink drain opening.

The apparatus comprises, in accordance with this invention, a second unit separate from the hopper and comminuting unit and including a power unit, such as a suitable electric motor, and a shaft or equivalent driven by the motor.

The hopper and comminuting unit is provided with means for mounting the power unit in operating position. The mounting means provides for the substantial closure of the hopper access opening by the power unit when mounted with the hopper unit, and clutch means are provided for effecting automatically a driving connection between the motor driven power unit shaft and the comminuting means by the mere act of mounting the power unit with the hopper unit.

Thus the act of placing the power unit in operating relation with the hopper unit effects a driving connection between the power unit and the comminuting means and effects substantial closure of the hopper access opening. The apparatus is provided with opening means, however, through which water may be supplied from the sink faucet to the hopper during the comminuting operation. In one form of this invention this may be done by so shaping the power unit and access opening that when the power unit is in operating position an opening space is left outside of it through which water may flow.

Moreover, interlock means are provided between the power unit and hopper to hold the power unit from moving when it is operating the comminuting means.

For a more complete understanding of this invention reference should be had to the accompanying drawings in which:

FIG. 4 is a sectional, bottom plan view taken through the line 4—4 of FIG. 1 and looking in the direction of the arrows;

FIG. 5 is a sectional, top plan view taken through the line 5—5 of FIG. 1 and looking in the direction of the arrows;

FIG. 6 is a fragmentary sectional view taken through the line 6—6 of FIG. 5 and looking in the direction of the arrow; and FIG. 7 is a fragmentary sectional view taken through the line 7—7 of FIG. 5 and looking in the direction of the arrow.

Figure 1:
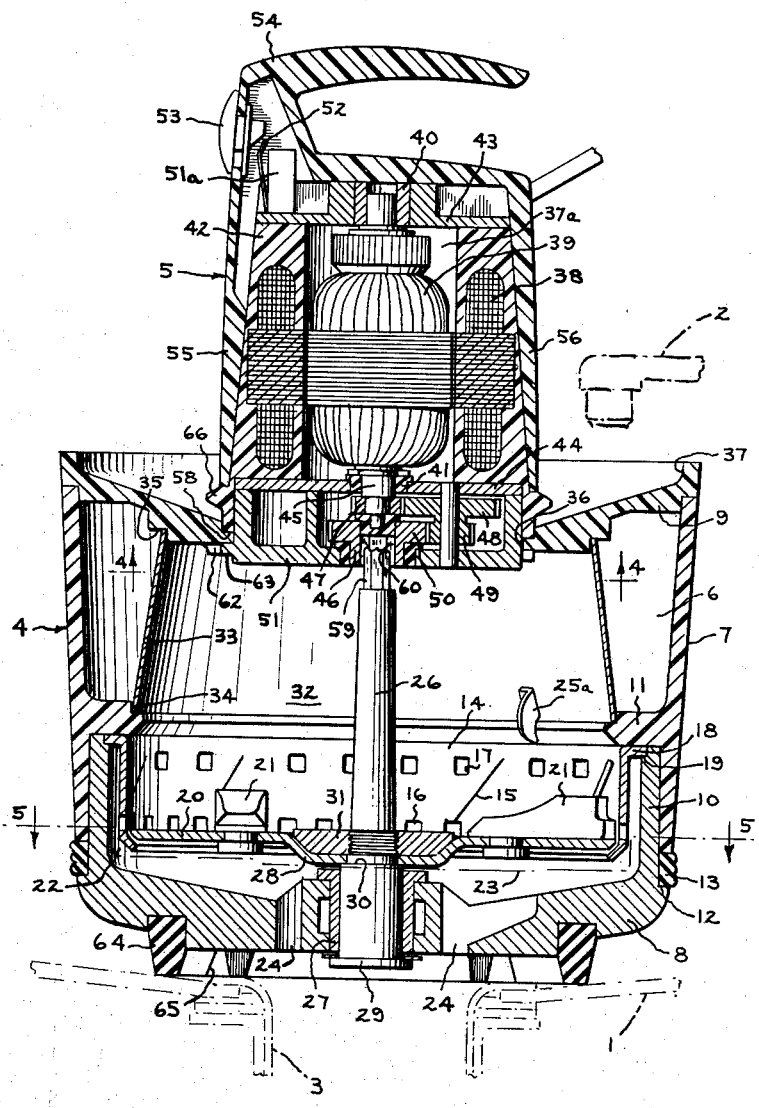
FIG. 1 is a vertical sectional view of portable waste disposal apparatus embodying this invention, the view being taken through the line 1—1 of FIG. 2 and looking in the direction of the arrows.

Referring to the drawings, this invention has been shown in one form as applied to portable waste disposal apparatus for operation in a kitchen sink, the bottom wall of which is designated by the numeral 1 and with which there is associated the usual cold water faucet 2. The disposal apparatus in accordance with this invention is arranged to comminute waste material supplied to it and discharge it into the sink drain 3 provided in the bottom wall 1, and it comminutes the waste material in the presence of water supplied from the cold water faucet 2. The waste disposal apparatus comprises separable units 4 and 5, the unit 4 constituting a combined hopper and comminuting apparatus, while the unit 5 constitutes controllable power means for driving the comminuting means, and adapted to be detachably mounted in an operating position on the hopper unit 4.

Figure 2:
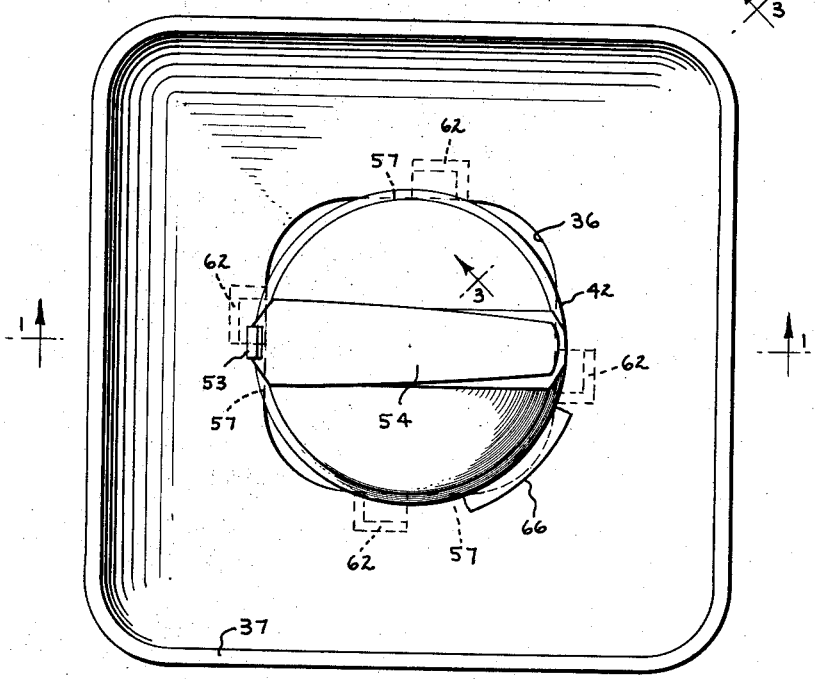
FIG. 2 is a top plan view of the apparatus shown in FIG. 1.

The hopper unit comprises a hopper 6 which is defined by a generally upright side wall 7, a bottom wall 8 and a top wall 9. The walls may be shaped to give the hopper any suitable form, but preferably and as shown they will be shaped to give it a box-like form, that is, the hopper will be rectangular (substantially square) in horizontal cross section, as shown in FIGS. 2, 4 and 5. The side wall 7 preferably will be formed of a suitable resin, and the bottom wall 8, which will house the comminuting means, likewise may be formed of a suitable resin or it may be made of metal, such as cast aluminum. The bottom wall 8 preferably is of cup-shape, as shown, being provided with an upright side wall portion 10 nested within the lower part of the side wall 7 and positioned with respect to it by an inner circular ridge 11 formed on the inside of the side wall. Interposed between the lower edge of side wall 7 and a ledge 12 on the bottom 8 is a combined bumper and decorative ring 13 formed of a resilient material, such as rubber. The walls 7 and 8 and ring 13 may be secured together in any suitable way as by bonding or gluing; or the rubber ring 13 may be assembled merely by "snapping" it in place.

The comminuting means is mounted within the cup-shaped bottom wall 8. Any suitable comminuting means may be used, but I prefer to use the comminuting means disclosed in the United States Patent to H. J. Macemon, 2,828,083, dated March 25, 1958 and assigned to the General Electric Company, the assignee of this application. Briefly, the comminuting means comprises a stationary shredding ring 14 which is provided with cutting surfaces 15 and a series of lower and upper apertures 16 and 17. The shredding ring is provided with an out-turned flange 18 at the top sandwiched between the lower surface of rib 11 and a seat 19 provided for it in the upper edge of the side wall 10 of bottom 8, the flange 18 functioning to support the shredding ring. Co-acting with the shredding ring is a rotatable material impelling flywheel 20 which is provided with a pair of movable impellers 21 arranged when the flywheel is rotated (counterclockwise looking down on the flywheel) to impel the waste material against the shredding ring 14 to comminute the material to a fine mass. It will be understood that during this operation water will be caused to flow into the hopper, and that eventually the water and comminuted material will be impelled outwardly through the apertures 16 and 17 into an annular drain space 22 provided between ring 14 and wall 10 and thence downwardly into a drain chamber 23 under the flywheel 20. The drain chamber 23 drains through three equally spaced elongated openings 24 formed in the bottom wall 8 into the drain line 3 of the sink, over which opening the apparatus will be positioned, as shown in FIG. 1. Preferably and as shown more clearly in FIGS. 5, 6 and 7, a series (three in the embodiment illustrated) of spiral shaped vanes 25 will be provided to direct the mixture from the discharge space 22 towards the openings 24, and functioning also to break up any tendency for vortices in the mixture to form—all as the flywheel 20 rotates counterclockwise as viewed in FIG. 5. The spiral shaped vanes to effect these functions are not a part of our invention but are the invention of Ernest F. Shell and Robert C. Pressley, Jr. which is described and claimed in copending application Serial No. 67,728, now Patent No. 3,071,329, filed concurrently herewith and assigned to the General Electric Company, the assignee of this application.

An interrupter or flipper 25a is provided to prevent waste, such as carrots, potatoes, lemons and the like from piling up against the shredding ring 14 and riding along it as a bearing so to speak. The interrupter causes the materials to be lifted off the shredding ring face and forces it to tumble around. This offers the shredding ring the opportunity successively to nibble away the edges of the mass and thereby comminute it.

The flywheel 20 is supported and driven by a driving shaft 26. This shaft is journalled in a bearing 27 provided for it in the central axis of the bottom wall 8. Preferably the central area 28 of the flywheel will be dished downwardly and it will constitute an upper thrust bearing for the flywheel, while the lower end of the shaft is provided with a head 29 which will constitute a lower thrust bearing. A flywheel retainer 31 is threaded on the shaft 26 and received in the dished area 28 of the flywheel to lock the flywheel to the shaft; preferably, in addition, the flywheel will be keyed to the shaft 26 by any suitable keying means. The positioning of the flywheel is accomplished by a shoulder cut 30 on shaft 26. The comminuting chamber 32 above the flywheel is defined by a metallic sleeve 33 formed as a frustrum of a cone and clamped between a seat 34 formed in the rib 11 and a seat 35 formed on the top wall 9, as shown.

Figure 3:
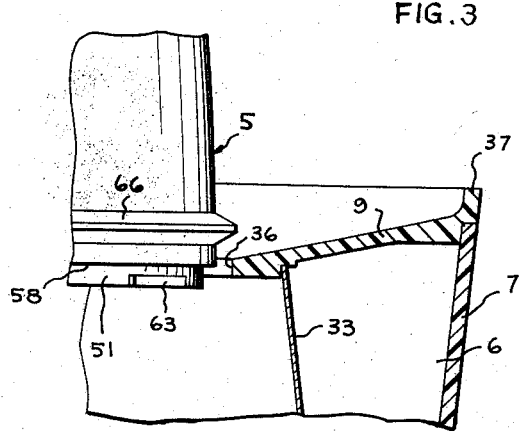
FIG. 3 is a fragmentary sectional view taken through the line 3—3 of FIG. 2 and looking in the direction of the arrows.

The top wall 9 seats upon the upper edge of the side wall 7 and is secured to it in any suitable way as by bonding or gluing. The top wall 9 is in effect an annular flange extending inwardly and downwardly in the top of the hopper in a generally funnel-like form. The inner edge of the flange 9 defines a relatively wide roughly square opening 36 (FIGS. 2, 3 and 4). This opening 36 constitutes an ingress opening for the introduction of waste material and water into the hopper and hence comminuting chamber 32 above the flywheel 20, and to prevent the splashing outward of the water the top wall 9 preferably will be provided with an outer upturned peripheral flange 37.

The shaft 26 extends vertically upwardly through the hopper, as shown, and into the opening 36. This shaft is driven by the power unit 5. The power means of this unit is a suitable electric motor 37a having a stator 38 and a rotor 39. Rotor 39 is mounted to rotate on a vertical axis (when power unit is in operating position of FIG. 1) in bearings 40 and 41. The motor further includes an outer cylindrical casing 42 (FIG. 2) and end plates 43 and 44 in which the bearings 40 and 41 are mounted respectively. The rotor 39 drives an operating shaft 45 which in turn drives an output shaft 46 through a gear reduction train comprising gears 47, 48, 49 and 50 the latter being formed as a part of output shaft 46. A gear housing 51 attached to the power unit houses the reduction gear train and journals the output drive shaft 46.

The motor 37a is controlled by means of an "on" and "off" switch 51a having a resilient actuator 52 operated by a pushbutton 53. The button preferably will be mounted in a handle assembly 54 for the power unit 5, as shown. When switch button 53 is depressed the motor will be energized, while when it is moved upwardly the motor will be de-energized. The handle assembly preferably will be made of a suitable resin and is generally U-shaped having arms 55 and 56 which embrace the motor housing 42 and are secured to it in any suitable way as by gluing or by screw fastening means (not shown).

The power unit 5 is arranged to sit in an operating position on the annular flange 9 over the ingress opening 36, as shown more clearly in FIGS. 1 and 2. For this purpose, the flange is provided with four secant-shaped seats 57 adjacent the four sides respectively of the opening 36 which receive and upon which the lower edge 58 (FIGS. 1, 3 and 4) of the cylindrical power unit housing 42 rests to support the power unit.

When the power unit 5 is moved to its operating position on the seats 57, an automatic connection is effected between the output shaft 46 and the flywheel shaft 26. This is accomplished by clutch means, one element of which is a hexagonal end 59 which is received in a complementary shaped socket 60 formed in the output shaft and constituting the second element of the clutch. Thus, when the power unit is shifted to its operating position the clutch elements move into interlocking relation to effect a driving connection between the motor 37 and flywheel 20. The socket 60 is somewhat larger than is the hexagonal end 59 in order to provide for misalignment between the axes of shafts 46 and 26 within narrow limits.

Also, when the power unit 5 is moved to its operating position on seats 57 its lower cylindrical end portion extends down through the square ingress opening 36. Coacting means are provided on this lower end portion and the annular flange 9 to prevent rotation of the power unit with respect to the flange when the motor is driving the flywheel, this means preventing clockwise rotation of the power unit as viewed in FIG. 2 (counterclockwise rotation as viewed in FIG. 4). This means comprises a series of stop lugs 62 formed on the bottom of flange 9 adjacent the opening 36 positioned substantially 90° apart, and a complementary series of spaced stop lugs or flats 63 formed on the power unit 5. The lugs 63 are spaced downwardly from the lower seating edge 58 of the power unit a distance slightly greater than the thickness of flange 9 below the secant-shaped seats 57 so as to lock the power unit to the flange 9 to prevent vertical displacement of the power unit. In other words the lugs 63 are eccentrically positioned with respect to the seats 57 so that when the power unit is mounted in the opening and turned the lugs will move into locking position with the seat sections 57.

It will be understood that the angle of contact between the stops 62 and motor lugs 63 is such that only the rotational torque is restrained in the generally lateral sense. This arrangement therefore permits the output drive shaft 46 and the shaft 26 to adjust freely for horizontal misalignment either statically or dynamically. Also, the power unit lugs 63 lock the power unit 5 positively to the hopper unit 4 against vertical thrust. This is important because of the constant upward thrust when the power unit is operating which thrust otherwise could knock the power unit off the hopper while the motor is still operating. Thus the locking means of the invention locks the power unit against vertical misalignment; and also because the lugs 62 and 63 have an angle of contact which interrupts only rotational torque, the power unit and its shaft are permitted to shift automatically and continuously to adjust for horizontal misalignment.

The entire disposal apparatus, as shown in FIG. 1, as supported on a generally circular resilient gasket 64 mounted on the bottom of the bottom wall 8, as shown, and having a diameter sufficiently large that it will encompass any sink opening 3 with which the apparatus normally will be associated. This gasket is provided with a series of circumferentially spaced narrow openings 65 so that the sink may drain even when the apparatus is placed over the opening 3.

It will be understood that in the handling and operating of this disposal apparatus, when it is not being used to comminute garbage and other waste materials the power unit 5 will be stored away in some convenient place such as a nearby cupboard, and the hopper unit 4 normally will be placed in the sink where it may serve as a refuse container for the waste material as it accumulates. If desired a suitable cover (not shown) may be provided for the opening 36 when the hopper is used in this way.

When it is desired to comminute the waste material which has accumulated in the hopper, the power unit 5 will be assembled with the hopper by bringing it into a position above the hopper and holding it so that the lugs 63 may be passed down through the corner areas of the opening 36 in the hopper flange 9; moving the power unit downwardly to cause the lower edge of the power unit (lower edge of gear housing 51) to pass below the undersurface of the flange 9 in order to bring the lugs 63 below the flange; and then turning the power unit to bring its lugs 63 into contact with the lugs 62 on the flange 9. The foregoing operation will lock the power unit on its seating edge 58, and moreover this operation of bringing the power unit into its operative position will cause the clutch members including the shaft 46 and the shaft end 59 to interengage and thereby effect a driving connection between the motor 37 and the flywheel 20. Then the motor may be operated by depressing the switch button 53. The motor when thus energized will operate the flywheel 20 continuously to comminute the waste material. And, as pointed out previously, during this operation water will be caused to flow through the hopper from the faucet 2 which water will flow into the depressed, or funnel-shaped annular flange 9 and through the open corner areas of opening 36 into the hopper. The flowable mixture of comminuted waste material and water will discharge through the openings 24 in the flange 8 into the drain 3.

If desired, a circular outwardly extending flange 66 may encircle the lower end of the power unit in a position so that it will be at a level above the opening 36 when the power unit is in place, as best seen in FIGS. 1 and 3; a fragment only of this flange has been illustrated in FIG. 2 for the sake of clarity in the illustration of other elements. This flange serves to overlie the open corner areas of opening 36 to prevent splashing of the waste material and water out of the hopper at these corner areas during the comminuting operation. Since the flange 66 is spaced above the opening 36 it, of course, will not interfere with the free flow of water from the top wall 9 around the power unit into the hopper.

When the comminuting operation has been completed the power unit may be removed by reversing the operation described above in connection with its assembly by turning it clockwise (when looking down upon it in FIG. 2) to bring the lugs 63 into the corner areas of opening 36 and then merely elevating it from the hopper.

It will be observed that this invention has provided a portable waste disposal device which is very convenient to operate and handle. The hopper unit 4 is small and relatively low and may be used in the sink like a sieve garbage basket or colander. The power unit at this time may be stored away. The power unit may be applied quite easily and when it has been moved into its operative position effects a driving connection with the comminuting means automatically, and moreover insures safety in that it is locked in the access opening 36 to prevent access of the hand or fingers into the hopper.

While we have shown and described a specific embodiment of our invention, we do not desire our invention to be limited to this particular construction shown, and we intend by the appended claims to cover all modifications within the true spirit and scope of our invention.

What we claim as new and desire to secure by Letters Patent of the United States is:

1. Portable waste disposal apparatus for use in a kitchen sink and the like comprising a housing forming a hopper enclosing a comminuting chamber and having an upper access opening for receiving waste material and a lower discharge opening for discharging comminuted waste material, waste comminuting means within said hopper for comminuting waste material supplied to said hopper and delivery of the comminuted material to said discharge opening including a rotatable waste material impeller having a first drive shaft, bearing means journalling said first drive shaft for rotation in said hopper and including a thrust bearing to prevent movement of said shaft out of said hopper, a separater power unit seatable in an operating position within said upper access opening of the hopper and having a second drive shaft for driving said impeller drive shaft, clutch means for effecting a driving connection between said two shafts only when said power unit is seated in its operating position upon said hopper, said power unit adapted to operate its shaft in a predetermined direction to drive said impeller to comminute waste material, and motion retarding means for said power unit interacting between said hopper and power unit when the power unit is seated in operating position on said hopper so as to prevent rotation of said power unit in a direction reverse to said predetermined direction of its drive shaft when the power unit is operated.

2. The waste disposal apparatus specified in claim 1, wherein said upper access opening is so shaped that it is not completely closed when said power unit is seated in its operating position on said hopper so that water may be introduced through said opening outside of said power unit during the comminuting operation.

3. Portable waste disposal apparatus for use in a kitchen sink and the like comprising a hopper for receiving waste material having a side wall and a bottom wall, shredding means fastened within said hopper including an impeller element rotatable to effect a comminution of the waste material in said hopper, and said hopper having a discharge opening in said bottom wall for the discharge of comminuted material from said hopper, said hopper also having an inturned flange-like top wall, the inner edge of the flange defining a central access opening for receiving waste material, a readily removable power unit separate from said hopper and impeller element and having a quick-connect operating position on said flange over said access opening, an opening means in said flange arranged so that when said power unit is in said operating position over said access opening water may be flowed into said hopper from said flange, clutch means rotatable by said power unit and movable into driving relation with said impeller element only when said power unit is moved into said quick-connect operating position on said flange, and stop means on said flange engageable with a part on said power unit to prevent its rotation with respect to said hopper when it rotates said impeller element.

4. The portable waste disposal apparatus specified in claim 3 wherein said power unit has a part fitted through said upper access opening when the power unit is seated in its operating position on said flange and said part is substantially cylindrical and said access opening is substantially rectangular so that the corner areas of said access opening provide the opening means for the passage of water into said hopper from said flange.

5. The portable waste disposal apparatus specified in claim 3 wherein said power unit has a part fitted through said upper access opening in said flange when the power unit is seated in its operating position, and said stop means comprises a plurality of spaced lugs on the bottom of said flange and a plurality of spaced lugs on said part of said power unit engageable with said first named lugs.

6. Portable waste disposal apparatus for use in a kitchen sink and the like comprising a housing forming a hopper enclosing a comminuting chamber and having an upper access opening for receiving waste material and a lower discharge opening for discharging comminuted waste material, waste comminuting means within said hopper for comminuting waste material supplied to said hopper and delivery of the comminuted material to said discharge opening including a rotatable waste material impeller in the lower portion of said hopper, a first drive shaft in driving relation with said impeller and having its lower end secured in the bottom of the hopper, said shaft extending up through said hopper toward said upper access opening, bearing means journalling said first shaft for rotation in said hopper and including a thrust bearing to prevent movement of said shaft out of said hopper, a separate power unit seatable in an operating position upon said hopper over said upper access opening and having a second drive shaft for driving said impeller drive shaft, clutch means for effecting a driving connection between said two shafts only when said power unit is seated in its operating position upon said hopper, said clutch means including an adaptor rotated by said second shaft and having a non-circular socket adapted to receive a complementary shaped section on the upper end of said impeller shaft to effect said driving connection, said power unit adapted to operate its shaft in a predetermined direction to drive said impeller to comminute waste material, and stop means for said power unit interacting between said hopper and power unit when the power unit is seated in operating position on said hopper to prevent rotation of said unit in a direction reverse to said predetermined direction.

7. Portable disposal apparatus for use in a kitchen sink and the like comprising a hopper having a side wall, a bottom wall and a top wall formed as an in-and-downturned annular flange which at its inner edge defines a top access opening through which waste material may be inserted into said hopper, said bottom wall having a discharge opening therethrough, comminuting means in the lower part of said hopper above said bottom discharge opening having a stationary shredding element and a rotary impeller for impelling waste material against said shredding element to comminute said material for discharge through said discharge opening, a first driving shaft connected to said impeller extending upwardly in said hopper towards said access opening, bearing means journalling said first shaft for rotation in said hopper and including a thrust bearing preventing movement of said shaft out of said hopper, a separate power unit having an electric motor, and a second shaft driven by said motor, seat means on said flange around said annular access opening upon which said power unit is mountable in an operating position over said opening and which unit when in said position substantially closes said opening, driving connection means between said shaft interconnecting them in driving relation upon the placement of said power unit on said seat means, said power unit when on said seat means having an extension section extending downwardly through said opening, a stop on said section and a stop on said flange for engagement therewith to prevent rotation of said power unit when said motor drives said shafts, and opening means in said flange to provide for the admission of water to said hopper when said power unit is on said seat means.

8. The waste disposal apparatus as specified in claim 7 wherein said opening means is defined by the access opening which is non-circular in shape and the power unit extension section which is substantially circular, whereby openings are provided in said flange outside of said power unit.

9. The waste disposal apparatus as specified in claim 1 wherein a resilient gasket is provided for supporting the hopper above a sink drain opening and the gasket is provided with horizontally disposed openings for the passage of liquids therethrough.

10. The disposal apparatus specified in claim 3 wherein said stop means consists of a series of stop lugs on said flange engagable with a complementary series of lugs on said power unit, the angles of the faces of engagement of said lugs respectively retaining only the rotational torque in a generally horizontal direction so that said power unit may adjust horizontally.

11. Portable disposal apparatus for use in a kitchen sink and the like comprising a hopper having a side wall, a bottom wall and a top wall formed as an in-and-downturned annular flange which at its inner edge defines a top access opening through which waste material may be inserted into said hopper, said bottom wall having a discharge opening therethrough, comminuting means in the lower part of said hopper above said bottom discharge opening having a stationary shredding element and a rotary impeller for impelling waste material against said shredding element to comminute said material for discharge through said discharge opening, a first driving shaft connected to said impeller extending upwardly in said hopper towards said access opening, bearing means journalling said first shaft for rotation in said hopper and including a thrust bearing preventing movement of said shaft and of said hopper, a separate power unit having an electric motor, and a second shaft driven by said motor, seat means on said flange around said access opening upon which said power unit is mountable in an operating position over said opening and which unit when in said position substantially closes said opening, driving connection means between said shafts interconnecting them in driving relation upon the placement of said power unit on said seat means, said power unit when on said seat means having an extension section extending downwardly through said opening, stop lugs on said section spaced substantially 90° apart, stop lugs on said flange engageable with said first named stop means to resist motion of said power unit due to driving torque of said motor but providing continuously for movement of the power unit to adjust horizontally.

12. Portable waste disposal apparatus for use in a kitchen sink and the like comprising a hopper for receiving waste material having a side wall and a bottom wall, shredding means fastened within said hopper including an impeller element rotatable to effect a comminution of the waste material in said hopper, and said hopper having a discharge opening in said bottom wall for the discharge of comminuted material from said hopper, said hopper also having an inturned flange-like top wall, the inner edge of the flange defining an access opening for receiving waste material, a readily removable power unit separate from said hopper and impeller element and having an operating position on said flange over said access opening, an opening means in said flange arranged so that when said power unit is in said operating position over said access opening water may be flowed into said hopper from said flange, clutch means rotatable by said power unit and movable into driving relation with said impeller element when said power unit is moved into said operating position, said power unit having a series of lugs passing through said opening to the under-side of said flange when said power unit is seated in its operating position and which are eccentrically positioned with parts of said flange openings so that the power unit may be locked against vertical displacement by turning said power unit on said flange to bring said lugs under said flange parts, and a lug on said flange for engaging one of said series of lugs to prevent rotation of said power unit on said seat when it is operating said comminuting means.

13. A portable waste disposal apparatus as recited in claim 1 wherein the lower end of the first-mentioned drive shaft is journaled in a bearing in the bottom of the hopper, the upper end of said shaft being journaled within the power unit, the power unit in turn being supported by the hopper and serving as a removable upper bearing for the first-mentioned shaft so that when the power unit is separated from the hopper waste material may be introduced into the hopper through the access opening.

14. Portable waste disposal apparatus for use in a kitchen sink comprising a combined hopper and comminuting means as one element and a separable power unit as a second element, said hopper having a top annular flange with a central opening for receiving waste materials therethrough, the comminuting means being located in the bottom portion of the hopper and including a fixed shredding means and a rotary impeller for forcing the waste against the shredding means, said impeller being supported on a central vertical shaft, bearing means in the bottom of the hopper journalling said shaft for rotation in said hopper and including a thrust bearing which prevents movement of said shaft out of said hopper, the upper end of the shaft terminating adjacent the plane of the central opening, the power unit having a coupling means which is engageable with the upper end of the said shaft to effect a driving connection with it, the lower portion of the power unit being insertable through the central opening of the hopper as the shaft is engaged by the coupling, and locking means for holding the power unit in the opening against accidental vertical displacement and for holding the power unit fixed against rotary motion with respect to the hopper so that when the power unit is energized it will drive the impeller.

References Cited in the file of this patent
UNITED STATES PATENTS

| | | |
|---|---|---|
| 2,624,515 | Brown et al. | Jan. 6, 1953 |
| 2,629,558 | Miller | Feb. 24, 1953 |
| 2,857,109 | Haeussler | Oct. 21, 1958 |